United States Patent [19]

Welsch et al.

[11] Patent Number: 4,989,519
[45] Date of Patent: Feb. 5, 1991

[54] SHELVING SYSTEM HAVING TWO SETS OF LOCKING TAPERS

[75] Inventors: John H. Welsch, Moscow, Pa.; Anthony P. Montalbano, Bayville; Douglas Hohlbein, Central Islip, both of N.Y.

[73] Assignee: InterMetro Industries Corporation, Wilkes-Barre, Pa.

[21] Appl. No.: 385,061

[22] Filed: Jul. 25, 1989

[51] Int. Cl.⁵ .............................................. A47B 3/00
[52] U.S. Cl. .................................. 108/111; 248/188; 403/334
[58] Field of Search ................... 108/111, 91, 92, 144; 211/188, 194, 126; 248/188; 403/334, 361

[56] References Cited

U.S. PATENT DOCUMENTS

| | | |
|---|---|---|
| 543,422 | 7/1895 | Ernest . |
| 557,174 | 3/1896 | Turner . |
| 1,512,867 | 10/1924 | Sutter . |
| 3,053,558 | 9/1962 | Challas, Jr. et al. ............. 108/91 X |
| 3,220,773 | 11/1965 | Burns . |
| 3,316,862 | 5/1967 | Dismuke ................................. 108/91 |
| 3,338,605 | 8/1967 | Stoeber ........................... 211/188 X |
| 3,424,111 | 3/1967 | Maslow . |
| 3,664,274 | 5/1972 | Bustos . |
| 3,783,801 | 1/1974 | Engman ........................... 211/188 X |
| 3,851,601 | 12/1974 | Davis ................................. 108/111 X |
| 3,874,511 | 4/1975 | Maslow . |
| 4,070,127 | 1/1978 | Loomis et al. ...................... 403/334 |
| 4,138,953 | 2/1979 | Tashman . |
| 4,145,977 | 3/1979 | Yellin ................................. 108/111 |
| 4,467,927 | 8/1984 | Nathan ........................... 108/111 X |

FOREIGN PATENT DOCUMENTS 169180 10/1959 Sweden ................................. 108/91

Primary Examiner—Peter A. Aschenbrenner
Attorney, Agent, or Firm—Fitzpatrick, Cella, Harper & Scinto

[57] ABSTRACT

A shelving apparatus includes a vertically extending first leg having a first end with a frusto-conical outer surface. A horizontal shelf has a frusto-conical hole. A vertically extending second leg has a first end with (a) a frusto-conical inner surface having a taper shaped to engage the frusto-conical outer surface of the first leg, and (b) a frusto-conical outer surface having a taper shaped to engage the frusto-conical inner surface of the shelf hole. Preferably, all engaging frusto-conical surfaces and holes are coaxial and cofrustal. Alternative tapered structures for the first and second legs and shelf hole may be provided.

27 Claims, 3 Drawing Sheets

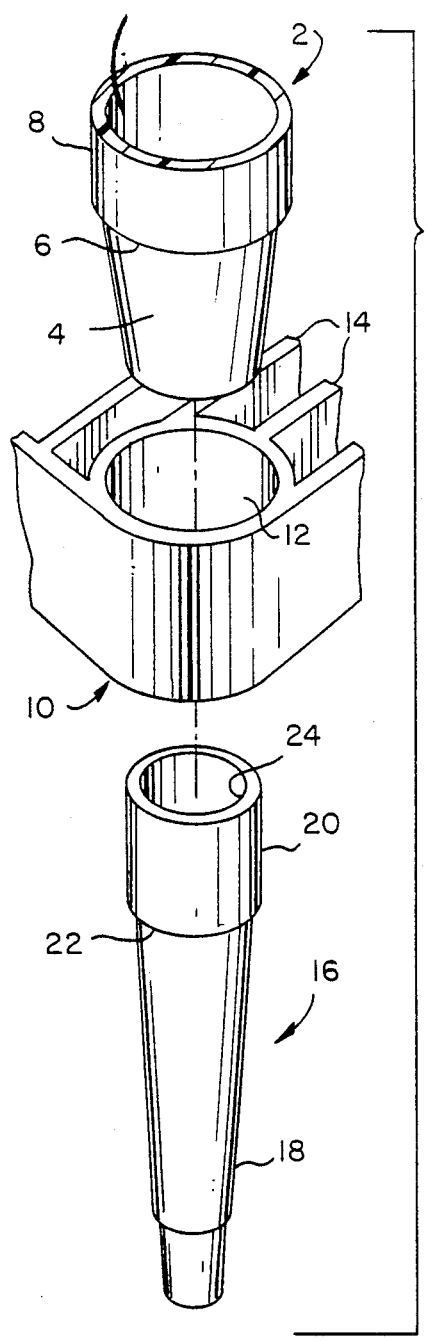
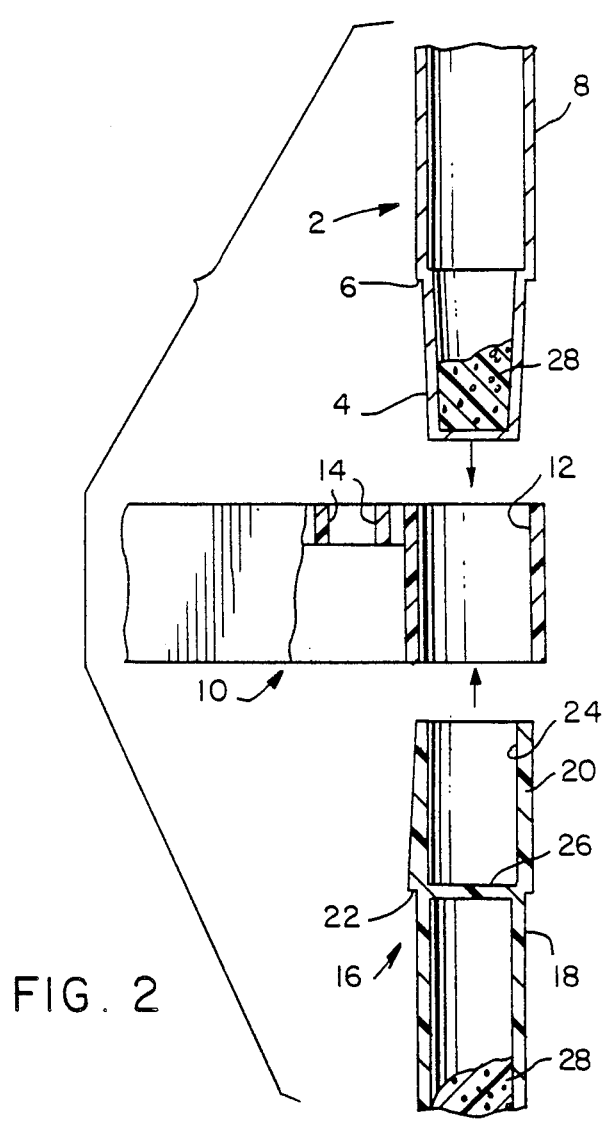
FIG. 1
FIG. 2

SHELVING SYSTEM HAVING TWO SETS OF LOCKING TAPERS

BACKGROUND OF THE INVENTION

1. Field of the Invention

The present application is directed to a shelving system in which several cooperating components are formed with two sets of locking tapers, and particularly to a shelving system in which frusto-conical shapes are provided to upper and lower legs, and to a shelf in order to provide a simple, effective interlocking design.

Shelving systems are widely known and commonly used in both the business, commercial, and residential environments. Traits of commercially successful shelving systems include economical manufacture, efficient packaging, easy assembly, and stability in use. However, many of the known shelving systems fall short of meeting all of the requirements described above. For example, U.S. Pat. 543,422 (Ernest) describes a system adapted for use as a folding voting booth. FIG. 2 shows a table body having four metal angle braces, one at each corner. As seen in FIG. 6, each angle brace has a frusto-conical hole therein. In addition, a roof covers a portion of the top of the hole to provide a smaller opening. The frusto-conical end of a lower wooden leg is inserted into the bottom of the hole in each brace. Then, the end of an upper wooden leg is inserted into the opening in the roof of the hole and then into a bore in the frusto-conical end of the lower leg, as depicted in FIG. 4. When weight is placed on the table, the brace will be pressed downward onto the lower support leg, thereby tightening the grip of the brace on the lower leg. However, this will not readily tighten the grip of the lower leg on the upper leg.

U.S. Pat. No. 1,512,867 (Sutter) discloses a pie rack in which frusto-conical hollow legs are stacked upon each other in telescoping fashion, as depicted in FIG. 3. Openings are provided in the side walls of each leg for receiving lugs formed on a shelf. This apparatus is difficult to assemble and places great stress on the shelf lugs. Therefore, the lugs must be reinforced, and assembly time can be lengthy.

U.S. Pat. No. 3,220,773 (Burns) discloses a multiple use knockdown unit in which frusto-conical legs pass through round holes in a horizontal shelf, as shown in FIG. 5. However, no provision is made for stacking multiple units, and imprecise tolerances on either the legs or the shelf holes will result in an unstable shelving system.

U.S. Pat. No. 3,873,511 (Maslow), which is assigned to the assignee of the subject invention, discloses a shelving system having a removable corner structure. As shown in FIG. 6, the corner structure 24 is coupled to a horizontal shelf 12 and adapted for coupling to the support post 50. A sleeve 60 is positioned on the support post 50 by an annular rib and groove structure 66. The sleeve 60 has an external frusto-conically shaped tapered surface adapted to mate with the tapered internal surface of the corner structure 24. Thus, a tight and secure fit is obtained between the sleeve 60 and the corner structure 24.

U.S. Pat. No. 3,424,111 (Maslow), also assigned to the assignee of the subject invention, discloses a shelving system that uses an annular rib and groove structure to position a sleeve on a vertical post thereby to mount a horizontal shelf. As shown in FIG. 2, a post 34 includes a plurality of horizontal grooves 36 which are adapted to mate with a corresponding rib on mating frusto-conical sleeve members 40 and 42. The members 40 and 42 are secured to the post 34. The sleeve members 40 and 42 have a frusto-conical outer surface which is adapted to support the horizontal shelf 10 through a similar frusto-conical surface therein.

U.S. Pat. No. 4,138,953 (Tashman) discloses an adjustable shelf assembly in which a shelf 11 has a hole in each corner thereof. As shown in FIGS. 4 and 5, a leg 12 is inserted in the hole until a groove 13 on the leg is disposed therein. Then, a collar 39 is inserted into the hole, from the bottom, about the leg until a tongue 42 on the collar mates with the groove 13. The collar 39 has a frusto conical outer surface adapted to engage a frusto-conical inner surface of the shelf hole. The difficulty of assembly of this system can be readily appreciated since forcing the collar 39 into the shelf hole may be difficult and require precise tolerances.

U.S. Pat. No. 3,664,274 (Bustos) discloses an adjustable merchandise support with molded shelves. Shelf 12 includes a plurality of corner holes 16, each having tapered surfaces 20. Each leg 26 is provided with a corresponding tapered wedge 22 which is adapted to engage the tapered surface 20 within each corner hole 16. Weight placed upon the shelf will tend to tighten the connection between the horizontal shelf 12 and the legs 26. However, when adding additional legs and additional shelving, no provision is made for tightening the grip of an upper leg onto a lower leg. In addition, the many requisite parts of this shelving apparatus make it expensive to manufacture and difficult to assemble.

Therefore, the known shelving devices such as those mentioned above share one or more of the disadvantages at least in certain applications.

U.S. Pat. No. 557,174 (Turner) discloses a rail bond connection mechanism utilized in a wholly unrelated field. As shown in FIG. 6, a first conductor A has a frusto-conical outer surface adapted to fit within a complementary frusto-conical inner surface of a sleeve C. Sleeve C also has a frusto-conical outer surface which is tapered in a direction and sense opposite than is its frusto-conical inner taper and adapted to mate with a frusto-conical inner surface of hole in a rail D. Thus, as force is applied on conductor A, it tightens the connection between conductor A and sleeve C, and at the same time, causes the connection between sleeve C and rail D to be tightened in turn.

SUMMARY OF THE INVENTION

The present invention provides vertical shelving apparatus which utilizes three structures having matching frusto-conical shapes in order to provide a simple, reliable, and easy to assemble system.

Accordingly, in a preferred embodiment the present invention provides a first support having a first frusto-conical surface. A shelf is included and has a first frusto-conical hole therein. A second support is then provided which has (a) a second frusto-conical surface adapted to engage the first frusto-conical hole in the first support, and (b) a second frusto-conical hole adapted to engage the first frusto-conical surface of the shelf. The mutually interlocking, tapered surfaces will therefore grip each other more tightly when weight is placed on any of the supports or shelf.

In accordance with another aspect, the present invention contemplates a shelving apparatus having a first leg with a first end having a conical outer surface. A shelf has a hole therein with a conical inner surface. A second leg is then provided and has a first end with (a) a conical outer surface formed to fit into the shelf hole conical inner surface, and (b) a conical inner surface formed to receive the first leg conical outer surface.

In accordance with yet another feature of the present invention, a vertical shelving apparatus includes a bottom leg having a first end with a frusto-conical outer surface. A horizontal shelf is provided and has at least one hole with a frusto-conical inner surface. A top leg has a first end with (a) a frusto-conical inner surface adapted to engage the frusto-conical outer surface of the bottom leg, and (b) a frusto-conical outer surface adapted to engage the frusto-conical inner surface of the shelf hole. The frusto-conical inner surface of the top leg and frusto-conical outer surface thereof are disposed adjacent one another.

Therefore, weight placed upon any of the parts of the subject invention will provide forces which cause all three components to grip each other more tightly.

The advantageous structure and functions according to the present invention will become more apparent when studying the following detailed description of the preferred embodiments, taken together with the accompanying drawing.

BRIEF DESCRIPTION OF THE DRAWINGS

FIG. 1 is a perspective view of one embodiment according to the present invention;

FIG. 2 is an exploded cross-section view of the apparatus depicted in FIG. 1;

DETAILED DESCRIPTION OF THE PREFERRED EMBODIMENTS

Figure 3:
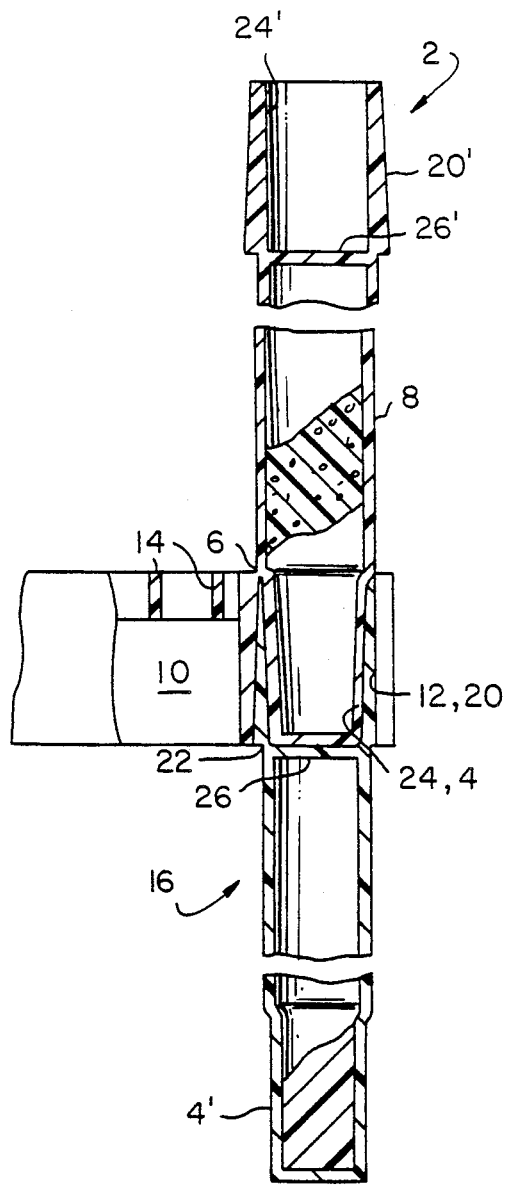
FIG. 3 is cross-section view of the embodiment of FIG. 1 in the assembled confirmation.

The present invention utilizes a simple design of interlocking tapered or frusto-conical surfaces in order to tightly lock the component parts together. Generally, in the first embodiment one support leg is provided with a frusto-conical outer surface and an adjacent frusto-conical inner surface, the respective surfaces having opposite tapers. That is, in one embodiment the outer surface is upwardly inwardly tapered and the inner surface is downwardly inwardly tapered. The outer surface is formed to complement and fit in a frusto-conical hole in the horizontal shelf to firmly support the shelf. The frusto-conical hole in the one leg is adapted to fit tightly with a complementary downwardly inwardly frusto-conical tapered surface on a second leg. Weight applied to either the one leg or the shelf causes the entire structure to be tightly locked by causing horizontal forces in the locking assembly to tightly grip adjacent frusto-conical surfaces.

Thus, the structure according to the present invention is very easy to assemble since the interengaging frusto-conical surfaces readily fit together. In addition, this structure is very inexpensive to manufacture, for example of plastics, and can take advantage of injection molding techniques.

In the first embodiment of the present invention, each shelf is of a generally rectangular shape with a frusto-conical aperture near each corner. The aperture is smaller at the top than at the bottom. The upper and lower posts are respective segments and are joined together at each shelf location. The system relies on two sets of locking tapers, one set between adjacent post sections, and one between the shelf and one post. Weight applied to the shelf causes both sets of tapers to lock more tightly. The major portion of each shelf is of molded plastic construction, and preferably will be injection molded glass-filled polypropylene.

More specifically, FIG. 1 is an exploded perspective view of a first embodiment according to the present invention, and FIG. 2 is an exploded cross-section view thereof. As shown in FIGS. 1 and 2, an upper leg 2 has a downwardly inwardly tapered frusto-conical outer surface 4 at one end thereof. A lip 6 separates a substantially straight cylinder portion 8 from the tapered surface 4. A horizontal shelf 10 is preferably rectangular and has a frusto-conical hole 12 in each corner thereof. The frusto-conical hole 12 has downward outward taper opposite to the frusto-conical surface 4 of the top leg 2. That is, the taper of frusto-conical hole 12 is such that the hole is smaller at the top than at the bottom. Horizontal shelf 12 may have a plurality of ribs 14 to increase the load bearing capabilities. As depicted in FIG. 1, frusto-conical hole 12 may be included within the periphery of the horizontal shelf 10, thus presenting rounded corners.

A bottom leg 16 includes a substantially straight cylinder portion 18 and an upwardly inwardly tapered frusto-conical outer surface 20 at one end thereof. A rim 22 circumscribes the bottom leg 16 between the straight cylinder portion 18 and the tapered surface 20. The taper of surface 20 substantially matches that of frusto-conical hole 12 in the shelf 10. These are mating surfaces and are dimensioned accordingly.

Inside and adjacent frusto-conical surface 20 is an downwardly inwardly tapered frusto-conical hole 24. The taper of hole 24 is opposite that of surface 20, that is, it is smaller at the bottom than at the top. A horizontal surface 26 may be disposed inside frusto-conical hole 24 adjacent rim 22. Surface 26 will provide further support for the top leg 2 while adding structural rigidity to the bottom leg 16. However, horizontal surface 26 is not a required structure, since the surface of the frusto-conical hole 24 and frusto-conical surface 20 are capable of bearing the weight of the upper leg 2 and the horizontal shelf 10.

FIG. 2 also depicts a glass or foam filling 28 disposed inside legs 2 and 16.

FIGS. 2 and 3 together depict the simple assembly process for the subject invention. First, the bottom leg 16 is inserted into horizontal shelf 10 from below. The frusto-conical surface 20 engages the frusto-conical hole 12 with a flush fit. At this point, the structure is capable of bearing weight placed on the shelf 10, although the connection between the frusto-conical surface 20 and frusto-conical hole 12 may not be tightly locked.

As shown in FIG. 3, the second step involves inserting the top leg 2 into the bottom leg 16 through the horizontal shelf 10. Specifically, the frusto-conical surface 4 is inserted downwardly through the hole in shelf 10 so as to engage the frusto-conical hole 24 within the bottom leg 16. Thus, paired frusto-conical surfaces 4 and 24, and 12 and 20 act to lock the structure together. Furthermore, as a downward force is applied on the leg 2 and/or the shelf 10, the tapered surfaces generate horizontal forces within the locking structure, thus acting to tightly lock the connecting portions together. Therefore, a downward force on the leg 2 will lock frusto-conical surfaces 4 and 24, and 12 and 20 together. Likewise, a weight placed on the shelf 10 will have the same effect. This unique locking mechanism thus ensures a stable structure capable of bearing a great deal of weight.

In addition, since the forces are distributed along the entire surface of each of the frusto-conical surfaces or holes, very heavy weights can be borne.

FIG. 3 also shows that lip 6 of upper leg 2 engages both the tip of the bottom leg 16, and the rim of the hole 12. This provides additional support, as well as ensuring that the upper leg 2 does not penetrate too far into the bottom leg 16.

FIG. 3 also depicts structure whereby a plurality of horizontal shelves can be coupled together. Specifically, the bottom leg 16 may be provided with another tapered surface 4' at the bottom end thereof. This tapered surface 4' may, in turn, be coupled to corresponding structure on a still lower support leg. Similarly, the top leg 2 may have a frusto-conical surface 20' and a frusto-conical hole 24' located therein in order to couple to a further upper support leg. Accordingly, those having skill in this field will readily understand the principles involved in providing additional shelving.

FIG. 3 also illustrates that the adjacent frusto-conical surfaces and holes are substantially contained within the same volume or axial extent. Thus, the surfaces are co-frustal in that their cone sections are coaxial and bounded by the same extent. Accordingly, all of the forces generated within the structure are contained in the same space, and the adjacent surfaces act to reinforce each other, thus providing a greater load bearing capability. This structure also is capable of withstanding greater shear and lateral forces applied to the connection joint.

Figure 4:
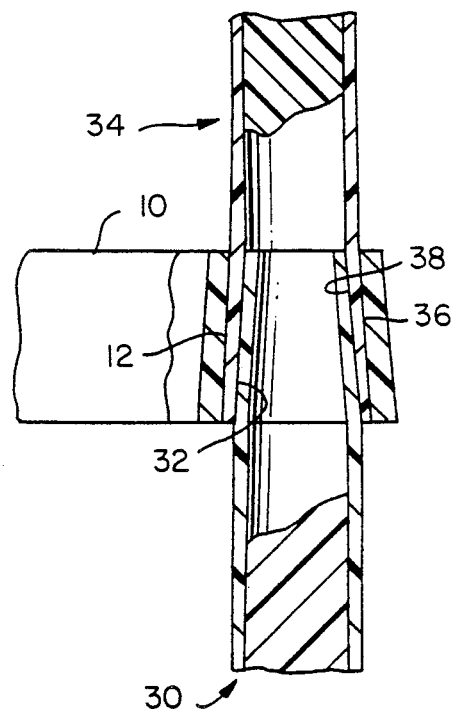
FIG. 4 is a cross-section view of another embodiment according to the present invention.

FIG. 4 depicts an alternative embodiment according to the present invention. In this embodiment, it is the upper leg which is sandwiched between the shelf and the lower leg. Specifically, lower leg 30 has a downwardly outwardly tapered frusto-conical outer surface 32. That is, the taper for this surface is smaller at the top than at the bottom. Horizontal shelf 10 is the same as in the first embodiment wherein a frusto-conical hole 12 which is also smaller at the top than at the bottom. However, this embodiment features an upper leg 34 which has a downwardly outwardly tapered frusto-conical outer surface 36, and a downwardly outwardly tapered frusto-conical inner surface 38, that are smaller at the top than at the bottom. Accordingly, the distance between surfaces 36 and 38 is constant, as opposed to the frusto-conical hole 24 and frusto-conical surface 20 in the earlier embodiment.

In the embodiment of FIG. 4, assembly is accomplished by first inserting the upper leg 34 through the bottom of the hole 12 in the shelf 10. Once the frusto-conical surface 36 engages the frusto-conical hole 12, the lower leg 30 is installed until the frusto-conical surface 32 engages the frusto-conical hole 38. Since the various frusto-conical surfaces are still bounded by the same axial extent, downward forces on the upper leg 34 and/or the shelf 10 tend to generate horizontal component locking forces. This embodiment may also include lips and rims (not shown) to establish the relative positions of the various components.

Figure 5:
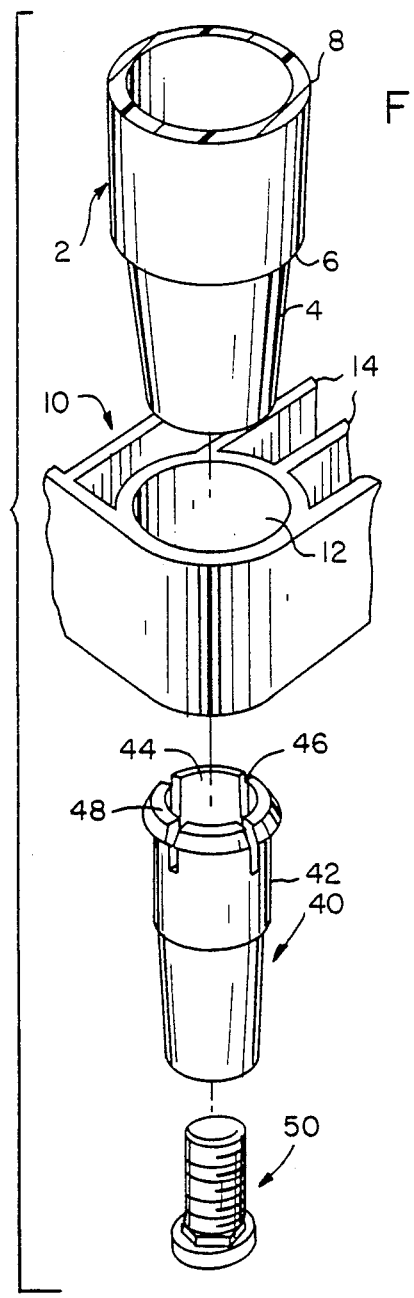
FIG. 5 is a perspective view of a third embodiment showing a leveler and caster arrangement for the present invention.
Figure 6:
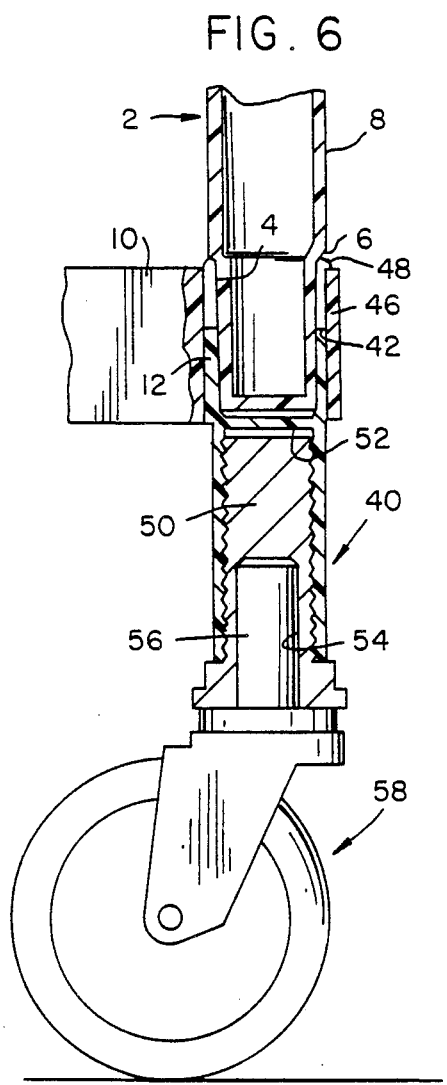
FIG. 6 is a cross-sectional view of the embodiment of FIG. 5.

FIGS. 5 and 6 show another embodiment featuring a unique lower leg 40. This lower leg 40 includes a frusto-conical surface 42 and a frusto-conical hole 44 similar to that of the first embodiment. However, at the upper end of the lower leg 40, a plurality of slits 46 are formed in the axial direction. At the top-most edge of the leg 40, a flange 48 circumscribes the tip. The flange 48 is used to lock the lower leg 40 into the apparatus, while the slots 46 provide flexibility to the tip when the lower leg 40 is being inserted through the frusto-conical hole 12.

As clearly depicted in FIG. 6, the flange 48 is adapted to securely grasp the rim of frusto-conical hole 12, and to provide a support base for the rim 6 of the upper leg 2. The dual function of flange 48 thus acts to further enhance the stability of the present invention.

The lower leg 40 also includes a threaded internal surface adapted to engage a leveler 50 therein. This leveler 50 is screwed into lower leg 40 to an extent necessary for leveling the shelving apparatus according to the present invention. Lower leg 40 may also include a horizontal surface 52 which may provide further support for the upper leg 2, and limit the travel of leveler 50.

Leveler 50 also includes a cylindrical hole 54 adapted to receive a caster post 56 from a caster assembly 58. Those having skill in this field readily understand that such an arrangement can provide for a mobile, yet stable vertical shelving apparatus adaptable to a wide variety of uses.

Thus, what has been described is an inexpensive, stable, light-weight vertical shelving apparatus capable of bearing a great deal of weight, and capable of being very easily assembled. Those having skill in this field will readily appreciate the economic advantages accruing to such a design.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims.

What is claimed is:

1. A shelving apparatus, comprising:
   a first support having a first frusto-conical surface;
   a shelf having a first frusto-conical hole; and
   a second support having (a) a second frusto-conical surface adapted to engage said first frusto-conical hole, and (b) a second frusto-conical hole adapted to engage said first frusto-conical surface, wherein said first frusto-conical surface engages said second frusto-conical hole inside said first frusto-conical hole.

2. Apparatus according to claim 1, wherein said shelf comprises a horizontal surface having at least two said first frusto-conical holes disposed at a periphery of said shelf.

3. Apparatus according to claim 1, wherein said second frusto-conical hole in said second support is adjacent and inside of said second frusto-conical surface.

4. Apparatus according to claim 1, wherein all of said frusto-conical surfaces and holes engage one another within the same axial extent.

5. Apparatus according to claim 1, wherein said second frusto-conical surface of said second support includes coupling means at a distal end thereof for coupling to a lip of said first frusto-conical hole on said shelf.

6. Apparatus according to claim 1, wherein said shelf is rectangular, having a first frusto-conical hole at each of the four corners thereof, and wherein four said first supports and four said second supports engage said shelf.

7. Apparatus according to claim 1, wherein said first support has a lip at a top portion of said first frusto-conical surface, said lip abutting said shelf and said second frusto-conical surface of said second support.

8. Apparatus according to claim 1, wherein said first and said second supports and said shelf each comprise a plastic material.

9. Apparatus according to claim 1, wherein said first frusto-conical hole of said shelf and said second frusto-conical surface of said second support are tapered in the same first direction, and said first frusto-conical surface of said first support and said second frusto-conical hole in said second support are tapered in the same second direction, said first and second direction being opposite each other.

10. Apparatus according to claim 1, wherein each of said first frusto-conical surface in said first support, said frusto-conical hole in said shelf, and said second frusto-conical surface and second frusto-conical hole in said second support are all tapered in the same direction.

11. A shelving apparatus, comprising:
a first leg having first end with a conical outer surface;
a shelf having a hole with a conical inner surface; and
a second leg having a first end formed with (a) a conical outer surface adapted to fit into said conical inner surface of said shelf hole, and (b) a conical inner surface adapted to hold said conical outer surface of said first leg.

12. Apparatus according to claim 11, wherein said shelf has a plurality of corners each having a hole with a conical inner surface.

13. Apparatus according to claim 12, wherein a first leg and a second leg are provided for each of said plurality of shelf corners.

14. Apparatus according to claim 11, wherein said conical inner and outer surfaces of said second leg extend the same length in an axial direction.

15. Apparatus according to claim 11, wherein all of said conical inner and outer surfaces are bounded by the same volume when they are respectively engaged.

16. Apparatus according to claim 11, wherein said conical inner and outer surfaces of said second leg are coaxial frusto-conical surfaces tapered in opposite directions.

17. Apparatus according to claim 11, wherein said conical inner and outer surfaces of said second leg are coaxial frusto-conical surfaces tapered in the same direction.

18. Apparatus according to claim 11, wherein said shelf has a lip around one end of said conical inner surface, wherein said first leg has a rim around one end of said conical outer surface; and wherein said second leg has coupling means at one end of said conical outer surface adapted to (a) couple with said shelf lip, and (b) abut said first leg rim.

19. A shelving apparatus, comprising:
an upper vertically extending leg having a first end formed with a frusto-conical outer surface;
a horizontally extending shelf having a hole formed with a frusto-conical inner surface; and
a lower vertically extending leg having a first end formed with (a) a frusto-conical inner surface shaped to engage said frusto-conical outer surface of said upper leg, and (b) an adjacent frusto-conical outer surface shaped to engage said frusto-conical inner surface of said shelf hole, wherein downward forces applied to said upper leg and said shelf cause said frusto-conical inner and outer surfaces to be forced together.

20. Apparatus according to claim 19, wherein all of said frusto-conical inner and outer surfaces are coaxial and approximately cofrustal when they are respectively engaged.

21. Apparatus according to claim 19, wherein said lower leg includes locking means for locking said bottom leg inside said shelf hole.

22. Apparatus according to claim 20, further comprising a plurality of top legs, a plurality of bottom legs, and wherein said shelf has a plurality of corners each having a hole with a frusto-conical inner surface.

23. Apparatus according to claim 21, wherein said frusto-conical hole of said shelf and said frusto-conical outer surface of said lower leg are tapered in the same first direction, and said frusto-conical outer surface of said upper leg and said frusto-conical hole in said lower leg are tapered in the same second direction, said first and second direction being opposite each other.

24. A shelving apparatus, comprising:
a lower vertically extending leg having a first end formed with a frusto-conical outer surface;
a horizontally extending shelf having a hole formed with a frusto-conical inner surface; and
an upper vertically extending leg having a first end formed with (a) a frusto-conical inner surface shaped to engage said frusto-conical outer surface of said lower leg, and (b) an adjacent frusto-conical outer surface shaped to engaged the frusto-conical inner surface of said shelf hole, wherein downward forces applied to said upper leg and said shelf cause said frusto-conical inner and outer surfaces to be forced together 25. Apparatus according to claim 24, wherein all of said frusto-conical inner and outer surfaces are coaxial and approximately cofrustal when they are respectively engaged.

26. Apparatus according to claim 24, further comprising a plurality of top legs, a plurality of bottom legs, and wherein said shelf has a plurality of corners each having a hole with a frusto-conical inner surface.

27. Apparatus according to claim 24, wherein said frusto-conical hole of said shelf, said frusto-conical inner and outer surfaces of upper leg, and said frusto-conical inner surface of said lower leg are tapered in the same direction.

* * * * *

UNITED STATES PATENT AND TRADEMARK OFFICE
CERTIFICATE OF CORRECTION

PATENT NO. : 4,989,519

DATED : February 5, 1991

INVENTOR(S) : JOHN H. WELSCH, ET AL.

It is certified that error appears in the above-identified patent and that said Letters Patent is hereby corrected as shown below:

TITLE PAGE,
AT [56] REFERENCES CITED

"3,424,111 3/1967 Maslow" should read
--3,424,111 1/1969 Maslow--.

COLUMN 8

Line 19, "cofrustal" should read --co-frustral--.
Line 28, "claim 21," should read --claim 20,--.
Line 44, "engaged" should read --engage--.
Line 48, "together" should read --together.--.

Signed and Sealed this

Eighth Day of September, 1992

Attest:

DOUGLAS B. COMER

Attesting Officer     Acting Commissioner of Patents and Trademarks